May 18, 1954     A. CIGAN ET AL     2,678,830
AUTOMOTIVE FRAME SUSPENSION

Filed Feb. 3, 1950     4 Sheets-Sheet 1

INVENTORS
ANDREW CIGAN
WILLIAM DUTY
BY
*Christian R. Nielsen*
ATTORNEY

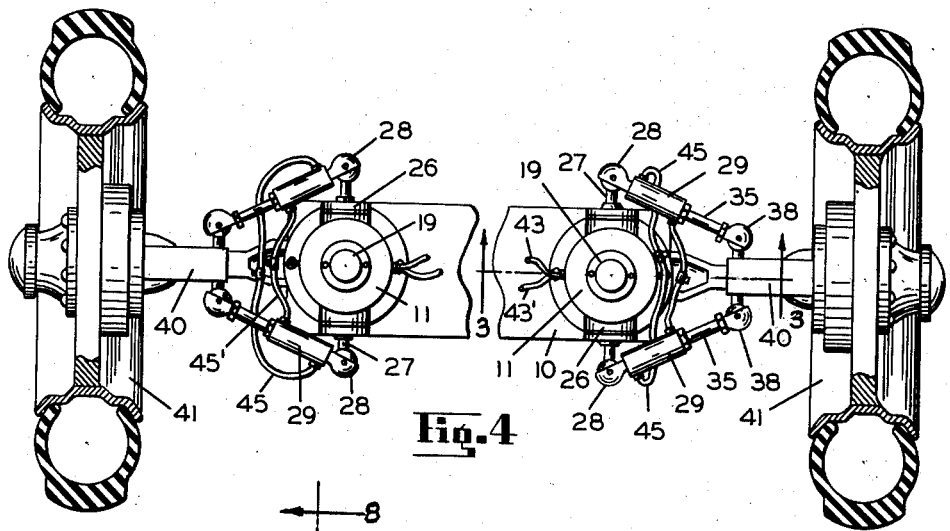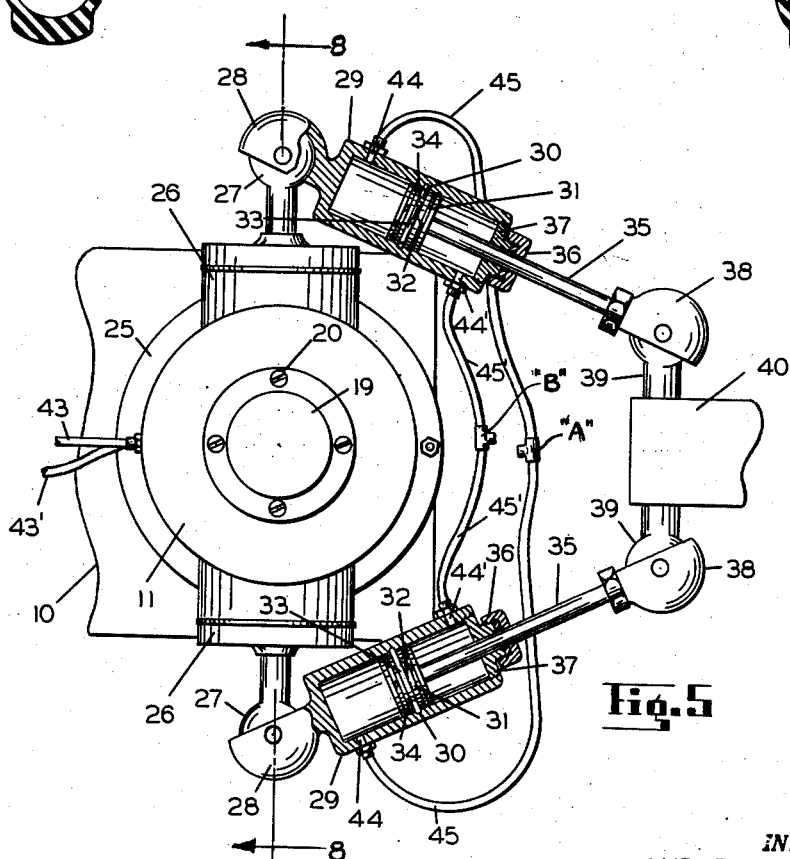

May 18, 1954  A. CIGAN ET AL  2,678,830
AUTOMOTIVE FRAME SUSPENSION

Filed Feb. 3, 1950  4 Sheets-Sheet 4

INVENTORS
ANDREW CIGAN
WILLIAM DUTY
BY
Christian R. Nielsen
ATTORNEY

Patented May 18, 1954

2,678,830

UNITED STATES PATENT OFFICE 2,678,830

AUTOMOTIVE FRAME SUSPENSION

Andrew Cigan, West Allis, and William Duty, Milwaukee, Wis.

Application February 3, 1950, Serial No. 142,152

4 Claims. (Cl. 280—124)

Our invention relates to improvements in wheel suspension, for automobile chassis or the like.

The object of our invention is to provide a means for suspending the chassis of an automobile or the like hydraulically, in combination with resilient supports.

A further object of our invention is to provide a device that will maintain an even pivoted relation of the frame and the wheels of the vehicle, while the vehicle wheels strike an obstruction or depression in the road.

It is manifest to anyone familiar with the art of driving an automotive vehicle on highways, whether these highways be provided with a smooth or uneven surface, that the momentum and speed of the vehicle will cause the wheels to receive an end thrust or pressure at the point contacting the pavement, and it is the object of our invention to provide a wheel and chassis suspension that will, at all times, permit the wheels and body to assume proper alignment and movement in synchronized relation to one another.

Other and further objects of our invention will become more apparent as the description proceeds when taken in conjunction with the drawings in which Figure 1 is a fragmentary front view of the end of a front cross member of an automobile frame, showing the wheel suspension with the tire in cross-section and the wheel in a normal vertical position.

Figure 4 is a top view of the wheel mounting on both sides of the front member of the frame.

Figure 5 is an enlarged view showing the horizontal cylinder with the pistons disposed in a neutral position.

Figure 1:
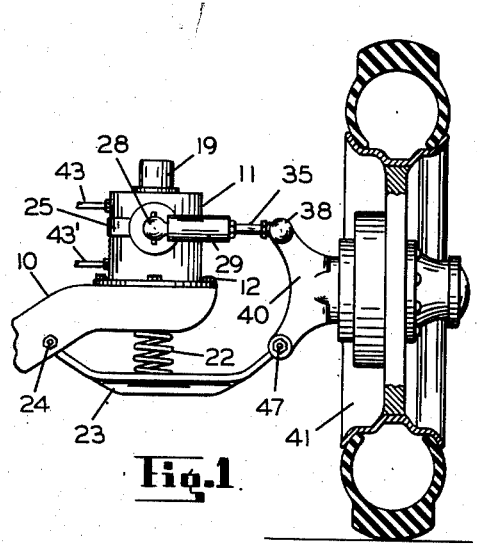

Similar characters of reference indicate corresponding parts throughout the several views and referring now to the same, the character 10 shows a front frame end member of an automobile; this member forms the front portion of the frame which has longitudinally disposed frame channels to support the body of the vehicle.

The ends of the frame member 10, support vertically disposed cylinders 11, attached at 12 to the member 10, and encasing vertically actuated pistons 13 supplied with piston rings of conventional design, and supported by vertical supported piston rods 14 and 14', shown journaled at 15 and 15' in stuffing nuts disposed within the top and bottom of the cylinder. Each cylinder wall is provided with a single semi-radial groove 16 surrounding its inner surface, and each piston 13 is equipped with a similar groove 17 surrounding its periphery and provided with a circular opening ring 18 disposed therein. This ring 18 is obviously of a resilient material. When the piston 13 is in neutral position, the ring 18 engages both semi-radial grooves 16 and 17 to retain the pistons 13 in a centrally disposed or neutral position.

The upper end of each vertical cylinder 11 is provided with a sealing cap 19, attached to the cylinder head at 20 to seal the piston rod 14 from the elements. The lower end of the piston rod 14' is equipped with a receptacle plate 21 acting as a support for the upper end of a resilient coil spring 22, which is seated at its lower end on a plate 23 which is hingedly supported at 24 to the frame member 10.

Attached to the outer periphery of the cylinder 11 at 25, are shown a pair of projecting members 26 supporting outwardly extending spherical swivel members 27 employed as mountings for the members 28 shown integrally attached to the end of the snubber cylinders 29. The inside wall of the cylinder 29 is provided with a semi-radial groove 30 and the piston slidably engages each of the snubber cylinders 29 and is equipped with conventional piston rings and a semi-radial groove 32 around its outer peripheral surface to receive a ring 33 which is of a resilient nature and provided as is the ring 18 in the cylinder 11 with an opening 34 so that the ring will normally fit into the cylinder groove when in an expanded neutral position and will contract and close the gap or opening 34 when the piston is slidably moved within the cylinders 29 and/or 11.

The piston 31 has a piston rod 35 which extends outward from the snubber cylinder 29 through the stuffing nut 36 on the cylinder end 37 and terminates in a hollow spherical member 38 which engages outwardly extending supports 39 on the upper end of the wheel mounting 40 which forms a support for the axle (not shown) to which the wheel 41 is rotatably mounted. Obviously the steering mechanism (not shown) on the front end of the vehicle would be attached to the supports 40.

Figure 6:
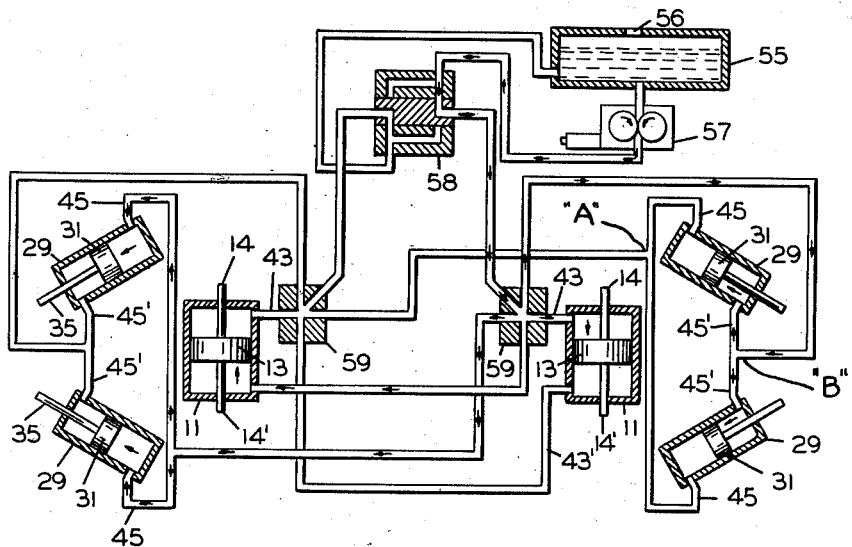
Figure 6 is a diagrammatic view of the hydraulic system fed by a pump drawing the supply from a reservoir.

The cylinders 11 are provided with outlets 42 and 42' which are equipped with tubular members 43 and 43' respectively, while the cylinders 29 are provided with similar outlets 44 and 44' equipped with tubular members 45 and 45' respectively which branch off at A and B respectively as shown in Figure 5 and Figure 6. Obviously the tubular members are all of a flexible material to permit movement during the operation of the pistons within the cylinders.

The lower end of the wheel mounting 40 is equipped with member 46 which hingedly supports the plate 23 at 47 by means of a universal joint or in any other efficient manner.

Figure 7:
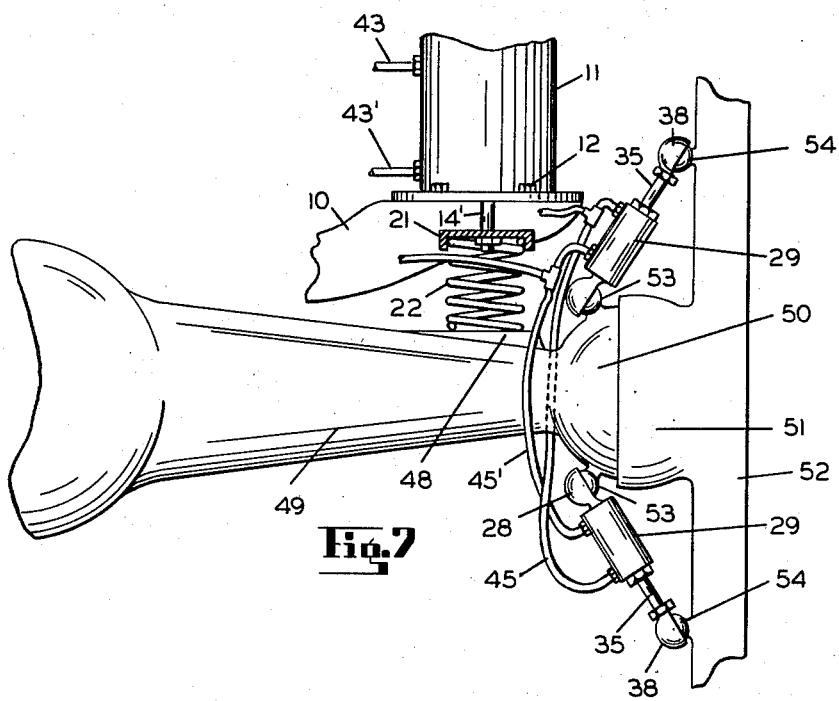
Figure 7 is a rear wheel mounting incorporating a universal drive on the rear drive shaft showing the component features incorporated in the front mounting.
Figure 8:
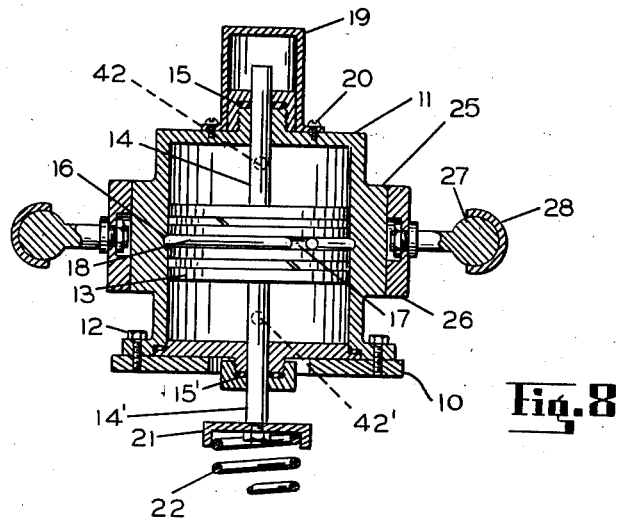
Figure 8 is a cross-sectional view taken at the line 8—8 in Figure 5.
Figure 9:
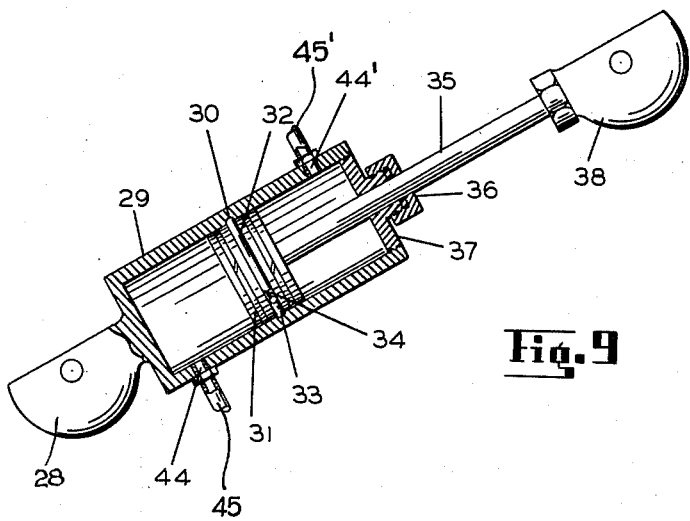
Figure 9 is an enlarged view of the cylinder construction as shown in Figure 5.

In Figure 7, we show a similar suspension for the rear end of the chassis in which the frame end 10 is supported by the spring 22 resting on a horizontal plate 48 shown forming an integral part of the rear axle housing 49 which housing is provided with a spherical member 50 engaging a hollow member 51 forming a part of the wheel support 52. The member 50 incases a universal drive attached to the rear drive shaft in the case of this rear suspension, as illustrated in Figure 7, and the snubber cylinders 29 are mounted one above the other and are supported by spherical members 53 shown integrally constructed with the hollow member 50 for engagement with the member 28 and spherical members 54 shown integrally constructed with the wheel mounting 52 are arranged for engagement with the member 38.

The schematic diagrammatic layout shown in Figure 6 illustrates the operation of the entire suspension which is hydraulically supplied from fluid disposed within a reservoir 55 which reservoir is provided with a filler opening 56 at its top and a pump 57 at its bottom. The system is shown incorporating a manually or mechanically controlled selector valve 58 and a pair of fluid flow equalizers 59. When the piston 31 in the snubber cylinder 29 moves in the direction indicated by the arrows, the fluid will enter the cylinder 29 by tubes 45 at one side and be exhausted by the tube 45', whereas the other side of the system it will enter by the tube 45' and be exhausted by the tube 45, thereby providing a synchronized movement of the wheels in their angular relation to one another and to the horizontal frame support or axle and when the pistons 13 are moved vertically within the cylinders 11, the hydraulic liquid will be forced out of the port 43' of one cylinder into the port 43 of the other cylinder on a downward stroke and the reverse flow will be made possible on the upward stroke.

It therefore becomes manifest that the movement of one wheel in a vertical plane will produce the same movement in the opposite wheel thereby compensating the movement of the body of the vehicle mounted unto the frame when obstructions and depressions in the road are encountered.

Figure 2:
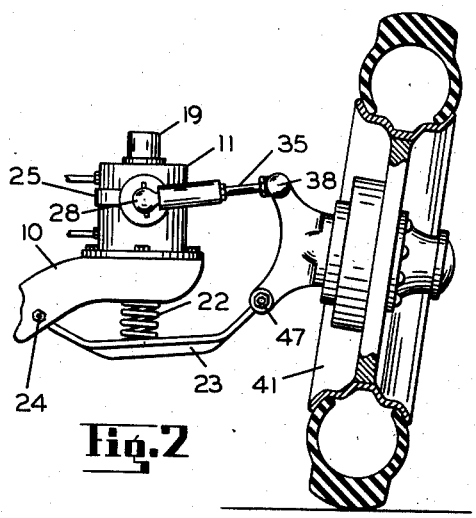
Figure 2 is a similar view as shown in Figure 1, with the wheel in an angular position as when rounding a curve.
Figure 3:
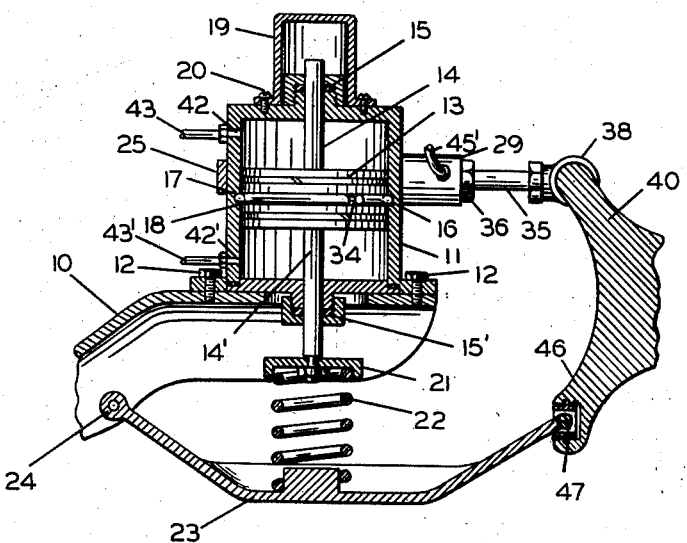
Figure 3 is a fragmentary cross-sectional view of the vertical hydraulic cylinder and piston arrangement in a neutral position taken at the line 3—3 in Figure 4, as when the wheel is vertically disposed as shown in Figure 1.

In operation the fluid in the vertical cylinders 11, cushion the suspension of the frame inasmuch as when the spring 22 on one side is compressed, and the piston 13 is forced upward, the fluid on top of the piston in that cylinder is forced to the opposite cylinder 11 below the piston 13 disposed therein. This same flow of fluid, but reversed, is true when the opposite spring 22 is compressed. The compression of the spring 22 is caused by either the raising of the wheel, or the vertical angular movement or slant of the wheel as shown in Fig. 2, due to the pivoted movement of the plate 23. When the wheels are turned by the steering mechanism, the pistons 31 within the snubber cylinders 29 function in like manner, namely the fluid ahead of the piston in one cylinder is forced behind the piston in the oppositely disposed cylinder in a synchronized manner. Obviously, the fluid is passed from one cylinder to the other by means of the pliable tubes as shown in the arrangement outlined in Fig. 6.

In the chosen embodiments of our invention there are many features not heretofore disclosed in the prior art and although we have specifically disclosed and described a particular arrangement of the component parts constituting the device, we are fully cognizant of the fact that there are many changes possible in their arrangement without departing from the spirit of our invention or the scope of the appended claims.

Having thus described our invention, what we claim and desire to secure by Letters Patent in the United States is:

1. A vehicle suspension of the character described comprising, a horizontal frame member, oppositely disposed axle supports adjacent each end of said frame member, an auxiliary axle projecting outward from each of said axle supports, a wheel rotatably mounted unto each of said auxiliary axles, a vertical cylinder mounted on each end of said frame member, a piston slideably mounted within each of said vertical cylinders, each of said pistons being provided with a piston rod extending respectively outward from each face of each of said pistons and slideably mounted within the upper and lower walls of the corresponding vertical cylinder, said axle supports provided with upper and lower pivot members, a horizontal plate for each of said axle supports, each of said plates hingedly supported at one end to said frame member and at the other end to the lower pivot member on a corresponding one of said axle supports, resilient means mounted on said plates at their upper face near the center thereof, adaptors secured to the lower end of each piston rod extending outward from and mounted on the lower wall of each of said vertical cylinders, said adaptors arranged for engagement with the upper end of said resilient means, said vertical cylinder walls provided with ports near the upper and lower end thereof, tubular members connecting the lower port of each of said cylinders respectively to the upper port in the oppositely disposed cylinder, a plurality of snubber cylinders, a plurality of snubber pistons corresponding in number to said snubber cylinders and slideably mounted therein, each of said snubber pistons provided with a rod extending outward from one end of each of the respective snubber cylinders, a plurality of projecting members attached to the outer wall of each of said vertical cylinders, one end of each of said snubber cylinders hingedly supported by a corresponding one of said projecting members, the outwardly extending end of each snubber piston rod hingedly attached to the upper pivot members of the corresponding one of said axle supports, each of said snubber cylinders provided with ports near each of their ends, other tubular members connecting the corresponding ports of said snubber cylinders and a fluid reservoir provided with a pump, tubular means leading to the vertical and snubber cylinders, said pump connected with said tubular means, said tubular means supplied with a selector valve for controlling the fluid disposed therein.

2. A vehicle frame suspension comprising in combination, a horizontal frame member, oppositely disposed axle supports adjacent each end of said frame member, an auxiliary axle projecting outward from each of said supports, wheels rotatably mounted on said auxiliary axle, a vertical cylinder mounted unto each of the opposite ends of said frame members, a piston mounted on a piston rod slideably mounted within each of said vertical cylinders, said rods extending respectively outward from the top and bottom wall of each of said corresponding cylinders, said axle supports provided with upper and lower pivoting engaging members, a horizontal plate for each of said axle supports, each of said plates disposed below said vertical cylinders, said plate hingedly supported at one end to said frame members and at the other end to the lower pivot member of a corresponding one of said axle supports, resilient means mounted on said plates at their upper face near the center thereof, the lower end of the piston rod extending outward from and mounted on the lower wall of each of said vertical cylinders provided with adaptors, said adaptors secured to the lower end of the piston rod adjacent the upper end of said resilient means, ports disposed through the vertical cylinder walls near their upper and lower ends, tubular means connecting the upper ports in each of said cylinders to the lower ports in the oppositely disposed cylinder, a plurality of snubber cylinders, a piston slideably mounted within each of said snubber cylinders, piston rods extending outward from said pistons through the one end of each of the respective snubber cylinders, a plurality of projecting members acting as a means for hingedly attaching one end of each of said snubber cylinders to the other wall of each of said vertical cylinders, the outwardly extending end of each snubber piston rod hingedly attached to the upper pivot members of the corresponding one of said axle supports, ports disposed within the snubber cylinder walls near their opposite ends, other tubular members connecting said ports within said snubber cylinders and a fluid reservoir provided with a control valve and a pump, said valve connected with a pliable tubular means connecting said vertical cylinder and snubber cylinder.

3. A vehicle suspension of the character described comprising, a horizontal frame member, a horizontally disposed axle supporting member adjacent said frame member, an axle adjacent each end of said support member and projecting outward therefrom and pivotally secured thereto, a wheel rotatably mounted on each axle, a vertical cylinder mounted on each end of said frame member, a piston slideably mounted within each of said vertical cylinders, a piston rod secured to each of said pistons, each of said rods extending outward from the top and bottom wall of each of said cylinders, said axle supporting member provided with upper and lower pivot engaging members, resilient means mounted to said axle at its upper face, an adaptor attached to the lower end of each of said piston rods extending outward from the bottom wall of each of said vertical cylinders, said adaptors secured to the lower end of the piston rod adjacent the upper end of said resilient means, said vertical cylinder walls provided with ports near their upper and lower ends, tubular members connecting the lower port of each of said cylinders to the upper port of the oppositely disposed cylinder, a plurality of snubber cylinders associated with each end of said supporting member, a plurality of snubber pistons corresponding in number to said snubber cylinders slideably mounted therein, each of said snubber pistons provided with rods extending outward from the one end of each of said snubber cylinders, one end of each snubber cylinder hingedly attached to the corresponding pivot engaging means of said axle supporting member, the outwardly extending end of each snubber piston rod hingedly attached to the corresponding axle, each of said snubber cylinders provided with ports near their ends, tubular members connecting said ports within each of said cylinders, and a fluid reservoir provided with a pump and a selector valve, said valve connected with pliable tubular means, other tubular means connecting the vertical cylinders and snubber cylinders and communicating with said pliable tubular means.

4. A device as described in claim 3, in which all pistons are provided with recess grooves on their outer peripheral surface and all cylinders are provided with recessed grooves around their inner surface, said pistons provided with resilient annular split rings for engagement with said grooves.

References Cited in the file of this patent

UNITED STATES PATENTS

| Number | Name | Date |
|---|---|---|
| 2,184,202 | Tschanz | Dec. 19, 1939 |
| 2,279,120 | Hurley | Apr. 7, 1942 |
| 2,387,249 | Eddington | Oct. 23, 1945 |